(12) United States Patent
Pacheco

(10) Patent No.: US 11,472,559 B1
(45) Date of Patent: Oct. 18, 2022

(54) COIL HINGE FOR AIRCRAFT SEAT

(71) Applicant: B/E Aerospace, Inc., Winston-Salem, NC (US)

(72) Inventor: Chad R. Pacheco, Colorado Springs, CO (US)

(73) Assignee: B/E Aerospace, Inc., Winston-Salem, NC (US)

(*) Notice: Subject to any disclaimer, the term of this patent is extended or adjusted under 35 U.S.C. 154(b) by 216 days.

(21) Appl. No.: 16/886,404

(22) Filed: May 28, 2020

Related U.S. Application Data

(60) Provisional application No. 62/826,722, filed on Mar. 29, 2019.

(51) Int. Cl.
| | | |
|---|---|---|
| *B64D 11/06* | (2006.01) | |
| *F16C 11/12* | (2006.01) | |
| *B60N 2/30* | (2006.01) | |

(52) U.S. Cl.
CPC .......... *B64D 11/0691* (2014.12); *F16C 11/12* (2013.01); *B60N 2/30* (2013.01)

(58) Field of Classification Search
CPC ....... B60N 2/30; B64D 11/0691; F16C 11/12; A47C 3/12; A47C 5/12; A47C 9/06; Y10T 16/525; Y10T 16/5253; Y10T 16/5257
USPC .......................................................... 297/14
See application file for complete search history.

(56) References Cited

U.S. PATENT DOCUMENTS

| | | | | |
|---|---|---|---|---|
| 814,766 A * | 3/1906 | Chambers | ................. | A47L 3/04 297/352 |
| 1,019,397 A * | 3/1912 | Winans | .................... | A47C 7/58 297/333 |
| 1,199,002 A * | 9/1916 | Freise | ....................... | A47C 9/06 297/14 |
| 1,363,940 A * | 12/1920 | Wasmansdorff | .......... | A47C 7/58 297/333 |
| 1,412,367 A * | 4/1922 | Noack | ................ | B64D 11/0691 297/14 |
| 1,430,248 A * | 9/1922 | Morse | .................... | A47C 7/025 297/452.17 |
| 1,954,376 A * | 4/1934 | Brueckl | ................. | A47C 7/021 297/230.11 |
| 2,556,076 A * | 6/1951 | Evans | ................. | B64D 11/0649 297/118 |
| 2,801,681 A * | 8/1957 | Crane | .................... | A47C 7/425 297/452.44 |
| 3,063,753 A * | 11/1962 | Mitchell | ................. | A47C 7/425 297/382 |
| 3,179,072 A * | 4/1965 | Coriell | .................... | A47D 11/02 108/106 |

(Continued)

*Primary Examiner* — James M Ference
(74) *Attorney, Agent, or Firm* — Suiter Swantz pc llo

(57) ABSTRACT

An aircraft seat may include a backrest and a seat pan coupled to the backrest. The backrest may include a plurality of backrest panels. A set of backrest panels of the plurality of backrest panels may be coupled via a coil hinge. The coil hinge may include a first plurality of holes formed in a first backrest panel of the set of backrest panels. The coil hinge may include a second plurality of holes formed in a second backrest panel of the set of backrest panels. The coil hinge may include a coil spring wound through the first plurality of holes and the second plurality of holes. The first backrest panel and the second backrest panel may be configured to rotate about an axis through the coil hinge when the seat pan and the backrest actuate between a stowed position and a deployed position.

15 Claims, 6 Drawing Sheets

(56) References Cited

U.S. PATENT DOCUMENTS

| | | | | |
|---|---|---|---|---|
| 4,902,069 | A * | 2/1990 | Lehnert | B64D 11/0691 |
| | | | | 297/14 |
| 6,550,859 | B1 * | 4/2003 | Andersson | B60N 2/72 |
| | | | | 297/452.52 |
| 8,360,496 | B2 * | 1/2013 | Farcas | B60N 2/3065 |
| | | | | 296/65.09 |
| 9,308,836 | B2 * | 4/2016 | Hausler | B60N 2/3031 |
| 9,565,949 | B2 * | 2/2017 | Peterson | A47C 7/40 |
| 10,414,503 | B2 * | 9/2019 | Spagl | B64D 11/062 |
| 10,543,923 | B2 * | 1/2020 | Pacheco | B64D 11/0691 |
| 10,807,720 | B2 * | 10/2020 | Pacheco | B64D 11/0698 |
| 2010/0176639 | A1 * | 7/2010 | Balgaard | A47C 7/66 |
| | | | | 297/354.13 |
| 2012/0260833 | A1 * | 10/2012 | Taylor | A47C 9/06 |
| | | | | 108/69 |
| 2014/0319275 | A1 * | 10/2014 | Najd | B60N 2/3018 |
| | | | | 297/14 |
| 2014/0368012 | A1 * | 12/2014 | Burd | B60R 22/00 |
| | | | | 297/337 |
| 2016/0376007 | A1 * | 12/2016 | Meindlhumer | B60N 2/305 |
| | | | | 297/14 |
| 2018/0155035 | A1 * | 6/2018 | Spagl | B64D 11/0691 |
| 2019/0161194 | A1 * | 5/2019 | Pacheco | B64D 11/0691 |
| 2019/0233120 | A1 * | 8/2019 | Spagl | B64D 11/0691 |

* cited by examiner

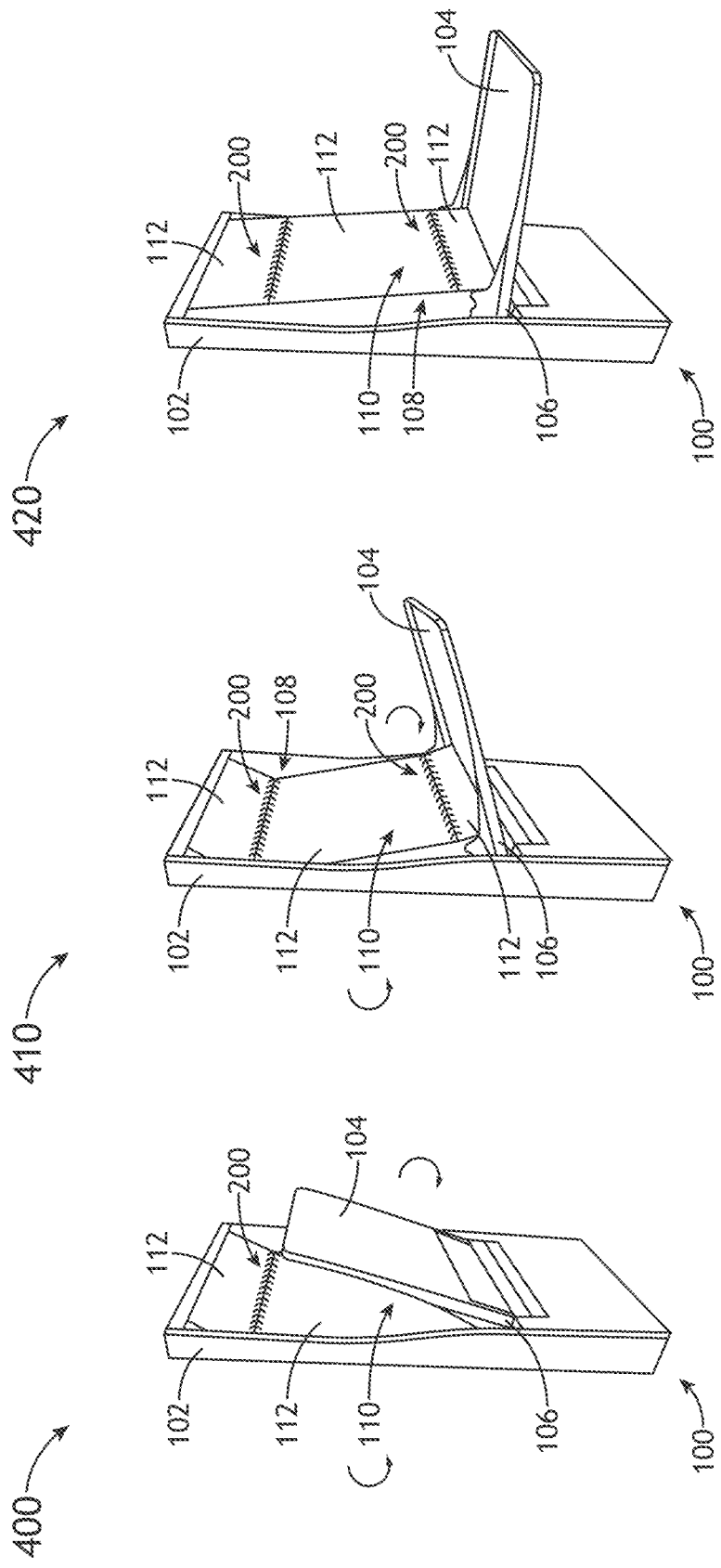

COIL HINGE FOR AIRCRAFT SEAT

CROSS-REFERENCE TO RELATED APPLICATIONS

The present application claims the benefit under 35 U.S.C. § 119(e) of U.S. Provisional Patent Application Ser. No. 62/826,722, filed Mar. 29, 2019, titled COIL HINGE, which is incorporated herein by reference in the entirety.

BACKGROUND

Select aircraft seats may be stowable. The select aircraft seats may include components configured to allow portions of the select aircraft seats to collapse or unfold when the select aircraft seat actuates between a stowed position and a deployed position.

SUMMARY

An aircraft seat is disclosed, in accordance with one or more embodiments of the disclosure. The aircraft seat may include a backrest. The backrest may include a plurality of backrest panels. A set of backrest panels of the plurality of backrest panels may be coupled via a coil hinge. The coil hinge may include a first plurality of holes formed in a first backrest panel of the set of backrest panels. The coil hinge may include a second plurality of holes formed in a second backrest panel of the set of backrest panels. The coil hinge may include a coil spring wound through the first plurality of holes and the second plurality of holes. The aircraft seat may include a seat pan coupled to the backrest. The seat pan and the backrest may be configured to actuate between a stowed position and a deployed position. The first backrest panel and the second backrest panel may be configured to rotate about an axis through the coil hinge when the seat pan and the backrest actuates between the stowed position and the deployed position.

In some embodiments, the aircraft seat may further include a housing. A cavity may be defined within the housing. At least a portion of the seat pan and at least a portion of the backrest may be configured to stow within the cavity when the seat pan and the backrest are in the stowed position.

In some embodiments, the set of backrest panels of the plurality of backrest panels may be a first set of backrest panels. The plurality of backrest panels may include a second set of backrest panels. The second set of backrest panels may include the second backrest panel and a third backrest panel.

In some embodiments, the second set of backrest panels of the plurality of backrest panels may be coupled via a second coil hinge. The second coil hinge may include a third plurality of holes formed in the second backrest panel of the second set of backrest panels. The second coil hinge may include a fourth plurality of holes formed in the third backrest panel of the second set of backrest panels. The second coil hinge may include a second coil spring wound through the third plurality of holes and the fourth plurality of holes. The second backrest panel and the third backrest panel may be configured to rotate about an axis through the second coil hinge when the seat pan and the backrest actuate between the stowed position and the deployed position.

In some embodiments, the third backrest panel of the plurality of backrest panels may be coupled to the housing.

In some embodiments, the plurality of backrest panels may include a third set of backrest panels. The third set of backrest panels may include the third backrest panel and a fourth backrest panel.

In some embodiments, the third set of backrest panels of the plurality of backrest panels may be coupled via a third coil hinge. The third coil hinge may include a fifth plurality of holes formed in the third backrest panel of the third set of backrest panels. The third coil hinge may include a sixth plurality of holes formed in the fourth backrest panel of the third set of backrest panels. The third coil hinge may include a third coil spring wound through the fifth plurality of holes and the sixth plurality of holes. The third backrest panel and the fourth backrest panel may be configured to rotate about an axis through the third coil hinge when the seat pan and the backrest actuate between the stowed position and the deployed position.

In some embodiments, the fourth backrest panel of the plurality of backrest panels may be coupled to the housing.

In some embodiments, at least one of the first coil spring being configured to be wound through the first plurality of holes and the second plurality of holes, the second coil spring being configured to be wound through the third plurality of holes and the fourth plurality of holes, or the third coil spring may be configured to be wound through the fifth plurality of holes and the sixth plurality of holes via a binding machine.

In some embodiments, the aircraft seat may further include one or more actuation assemblies. The seat pan may be coupled to the housing via the one or more actuation assemblies.

In some embodiments, the first backrest panel of the plurality of backrest panels may be coupled to the seat pan.

In some embodiments, at least one backrest panel of the plurality of backrest panels may include one or more cut-outs.

In some embodiments, the backrest may be a first backrest. The aircraft seat may include a second backrest. The first back rest and the second backrest may each be coupled to the seat pan.

In some embodiments, the plurality of backrest panels may be configured to flex and conform to a back of a passenger occupying the seat pan and the backrest when the seat pan and the backrest are in the deployed position.

A coil hinge for an aircraft seat is disclosed, in accordance with one or more embodiments of the disclosure. The coil hinge may include a first plurality of holes formed in a first backrest panel of a set of backrest panels. The coil hinge may include a second plurality of holes formed in a second backrest panel of the set of backrest panels. The coil hinge may include a coil spring wound through the first plurality of holes and the second plurality of holes. The coil hinge may be configured to provide an axis of rotation for the first backrest panel and the second backrest panel when a backrest of the aircraft seat and a seat pan of the aircraft seat coupled to the backrest actuate between a stowed position and a deployed position. The backrest may be formed from a plurality of backrest panels. The plurality of backrest panels may include the set of backrest panels.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4A illustrates a perspective view of an aircraft seat including a coil hinge, in accordance with one or more embodiments of the disclosure;

FIG. 4B illustrates a perspective view of an aircraft seat including a coil hinge, in accordance with one or more embodiments of the disclosure;

FIG. 4C illustrates a perspective view of an aircraft seat including a coil hinge, in accordance with one or more embodiments of the disclosure.

DETAILED DESCRIPTION OF THE INVENTION

Figure 1B:
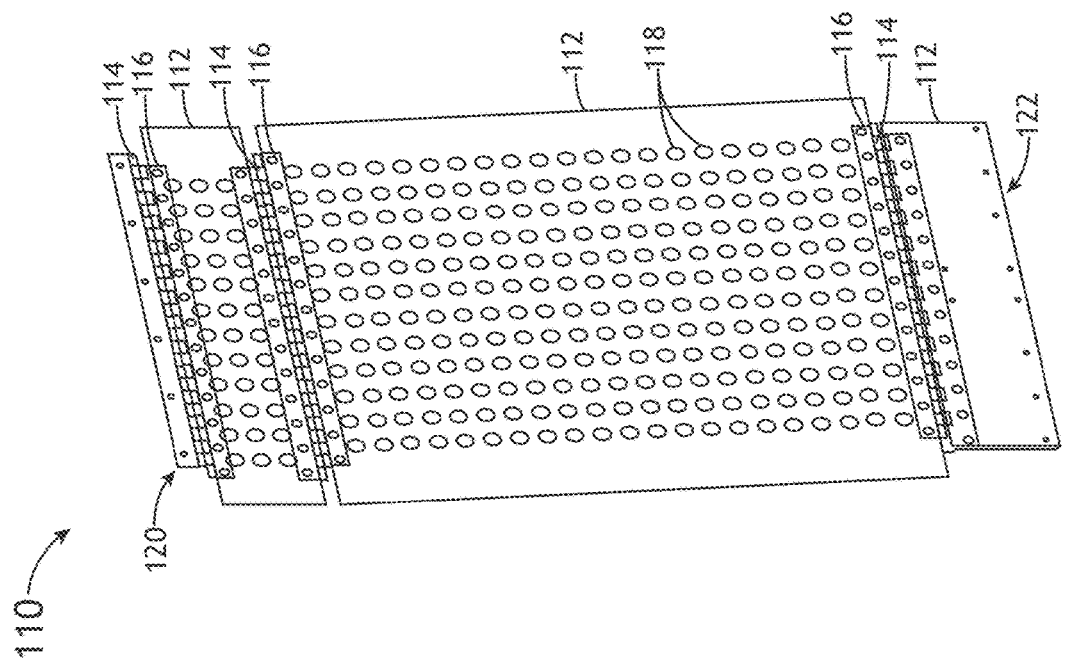
FIG. 1B illustrates a perspective view of a backrest of an aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1A-4D generally illustrate an aircraft seat with a coil hinge, in accordance with one or more embodiments of the disclosure.

Select aircraft seats may be stowable. For example, one type of select aircraft seat is a flight attendant seat designed for taxi, takeoff, or landing (TTOL) situations, turbulence, emergencies, or the like, as aviation guidelines and/or standards dictate that flight attendants be seated at these times. However, the aircraft seat design needs to address competing interests for increased passenger seating, storage space, lavatories, and/or galley spaces in addition to the need for the flight attendant seats within an aircraft cabin. Arranging aircraft cabins may require minimizing an amount of room used for storage space, lavatories, galley spaces, and the flight attendant seats in order to increase passenger seating. This minimizing may include modifying the arrangement and/or design of components including, but not limited to, a galley, an aircraft lavatory, seating for attendants, or other structures and/or monuments of the aircraft passenger cabin.

The select aircraft seats may include components configured to allow portions of the select aircraft seats to collapse or unfold when the select aircraft seat actuates between a stowed position and a deployed position. For example, the aircraft seat design may allow for stowing and deploying in an effort to trade more passenger seats for a combination auxiliary galley and lavatory monument including the flight attendant seat. It is noted herein, however, that such trade-offs may condense foot traffic to a particular portion of the aircraft cabin, resulting in a more congested area for flight attendants and passengers alike. By way of another example, select aircraft cabin designs may trade a larger galley and lavatories for fewer passenger seats.

When modifying the select aircraft seats to allow for a more compact arrangement, load-bearing/weight-bearing requirements must be met without losing the intended functionality of the select aircraft seats. For example, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Figure 1A:
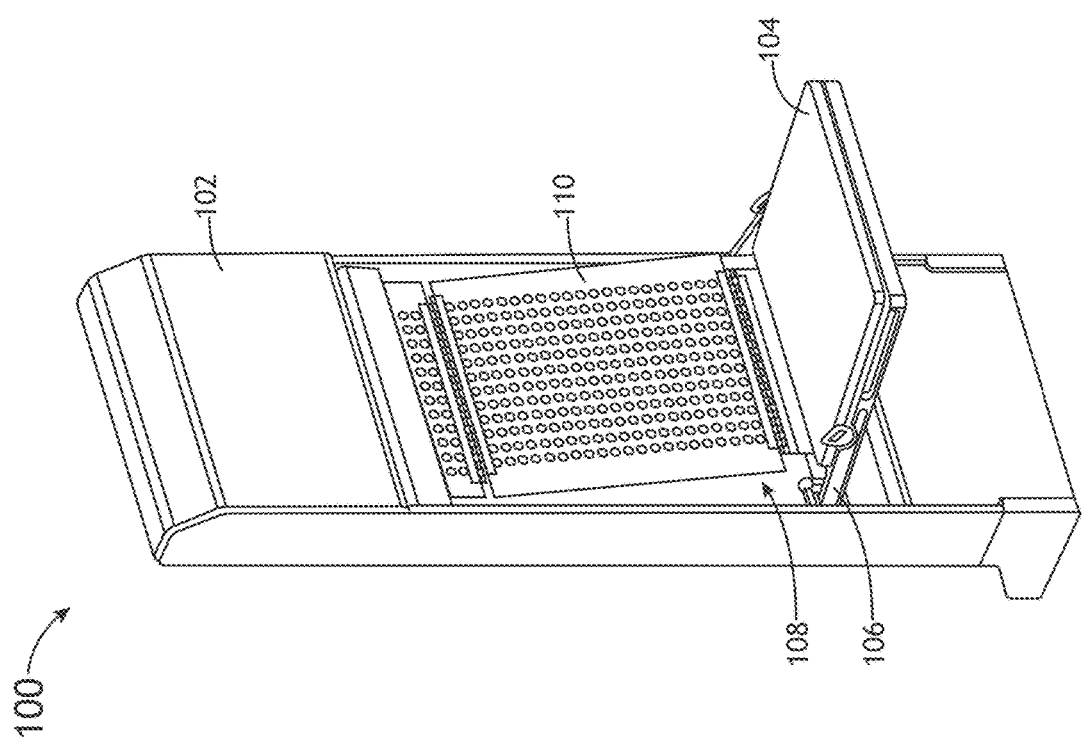
FIG. 1A illustrates a perspective view of an aircraft seat, in accordance with one or more embodiments of the disclosure.

FIGS. 1A and 1B illustrate one example of a stowable aircraft seat 100, in accordance with one or more embodiments of the disclosure. The aircraft seat 100 may include a housing 102. The housing 102 may include one or more aircraft seat frames. The housing 102 may include one or more cross-members coupled to the one or more aircraft seat frames and/or forming the one or more aircraft seat frames.

The aircraft seat 100 may include a seat pan 104. The aircraft seat 100 may include an actuation assembly 106. The seat pan 104 may be configured to actuate via the actuation assembly 106 between a stowed position and a deployed position. For example, the actuation assembly 106 may include one or more rails, tracks, sliders, or other components configured to translate the seat pan 104 between the stowed position and the deployed position. By way of another example, the actuation assembly 106 may include one or more hinges or other components configured to rotate or pivot the seat pan 104 between the stowed position and the deployed position. By way of another example, the actuation assembly 106 may include a combination of components to both translate and rotate or pivot the seat pan 104 between the stowed position and the deployed position. In general, the actuation assembly 106 may be any mechanism or device configured to meet aviation guidelines and/or standards.

In one non-limiting example, the seat pan 104 may be kept within the stowed position and/or the deployed position via a latch assembly. In general, the latch assembly may include any mechanism or device with actuators (e.g., such as a handle, a lever, a knob, a button, a toggle, or the like), locking pins (e.g., such as tabs, protrusions, hooks, or the like), cut-outs (e.g., such as a slot, a recess, a notch, a hole, a groove, or the like), threads, or other interlocking components configured to meet aviation guidelines and/or standards. It is noted herein, however, that the seat pan 104 may not be latched when in the stowed position and/or the deployed position. Therefore, the above description should not be interpreted as a limitation on the present disclosure but merely an illustration.

The aircraft seat 100 may include a cavity 108 defined within the housing 102. For example, the cavity 108 may be defined by the one or more aircraft seat frames of the housing 102. By way of another example, the cavity 108 may be defined by the one or more cross-members coupled to the one or more aircraft seat frames of the housing 102 and/or forming the one or more aircraft seat frames of the housing 102.

Figure 2B:
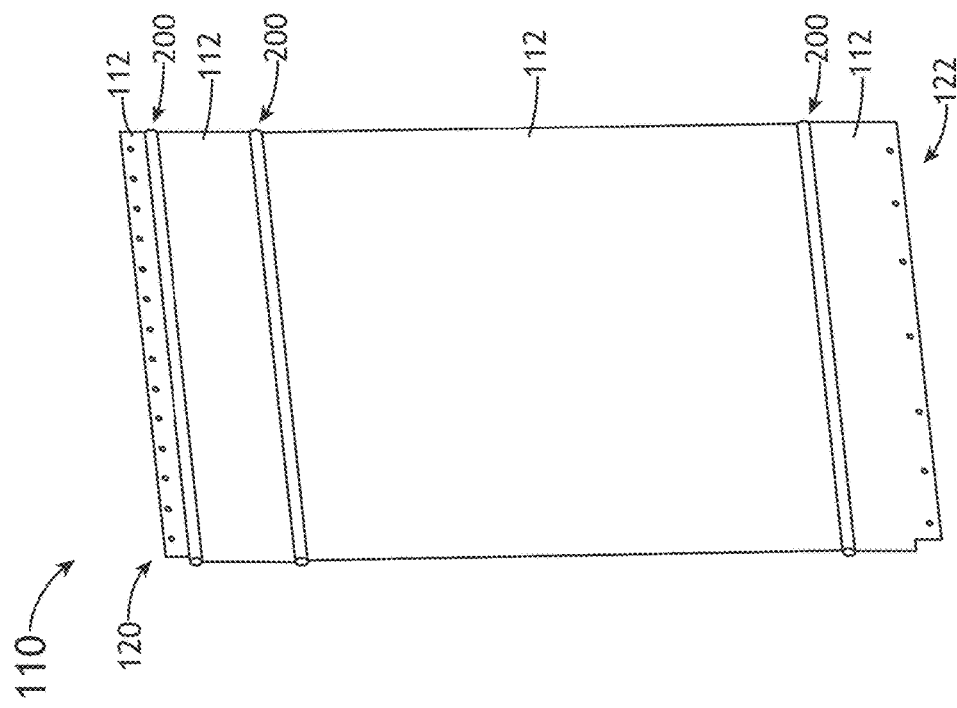
FIG. 2B illustrates a perspective view of a backrest of an aircraft seat including a coil hinge, in accordance with one or more embodiments of the disclosure.

The aircraft seat 100 may include a backrest 110. The backrest 110 may include one or more backrest panels 112. For example, the backrest 110 may include, but is not limited to, three or four backrest panels 112. In general, the backrest 110 may include a primary backrest panel 112 and a set of auxiliary backrest panels 112. For instance, in the case of the non-limiting example above, the backrest 110 may include a primary backrest panel 112 and two auxiliary backrest panels 112, as illustrated in FIG. 1B and FIGS. 3A-3C. In addition, in the case of the non-limiting example above, the backrest 110 may include a primary backrest panel 112 and three auxiliary backrest panels 112, as illustrated in FIG. 2B.

Adjacent backrest panels 112 may be coupled together via one or more hinges 114. For example, a hinge 114 may be coupled to a pair of backrest panels 112 via one or more fasteners 116, one or more interlocking assemblies, an adhesive, or the like. For instance, the one or more fasteners 116 may include, but are not limited to, rivets or other fasteners known in the art.

The one or more backrest panels 112 may include one or more cut-outs 118. For example, the one or more cut-outs 118 may be included to reduce weight of the backrest 110 (and the aircraft seat 100 as a whole). In general, a backrest panel 112 may include any number of cut-outs 118 in any pattern, to the extent the cut-outs 118 do not affect the structural integrity and/or load-bearing/weight-bearing capabilities of the backrest panel 112 (and the backrest 110 as a whole) (e.g., as dictated by aviation guidelines and/or standards).

A backrest panel 112 may be coupled to the housing 102 at a location 120. For example, the backrest panel 112 may be coupled to the housing 102 via one or more fasteners, one or more interlocking assemblies, an adhesive, or the like. For instance, the one or more fasteners may include, but are not limited to, rivets or other fasteners known in the art.

A backrest panel 112 may be coupled to the seat pan 104 or the housing 102 at a location 122. For example, the backrest panel 112 may be coupled to the seat pan 104 or the housing 102 via one or more fasteners, one or more interlocking assemblies, an adhesive, or the like. For instance, the one or more fasteners may include, but are not limited to, rivets or other fasteners known in the art.

The seat pan 104 and the backrest 110 may be configured to stow and deploy relative to the cavity 108, allowing the aircraft seat 100 to have the stowed position and the deployed position. For example, at least a portion of the seat pan 104 and the backrest 110 may be configured to stow within the cavity 108 in a vertical or substantially-vertical arrangement. By way of another example, the seat pan 104 and the backrest 110 may be configured to deploy to a horizontal or substantially-horizontal arrangement.

One or more cushions may be coupled to the seat pan 104. One or more cushions may be coupled to the backrest 110. The seat pan 104 and the one or more backrest panels 112 of the backrest 110 may be configured with a low-profile design so as to allow for thicker cushions that are still capable of stowing when the aircraft seat 100 is in the stowed position. For example, at least a portion of the seat pan 104 (e.g., the cushion coupled to the seat pan 104) and/or the backrest 110 may be configured to fit within the cavity 108 when the aircraft seat 100 is in a stowed position. By way of another example, the seat pan 104 and at least a portion of the backrest 110 may not be in the cavity 108 when the aircraft seat 100 is in a deployed position.

Although the aircraft seat 100 illustrated in FIGS. 1A and 1B includes a stowable and deployable functionality to assist in an overall design of the aircraft cabin, it is noted herein that the hinge-based build of the backrest 110 may result in an increased cost, weight, and/or installation time of the aircraft seat 100. As such, it would be beneficial to provide an aircraft seat 100 that meets aviation guidelines and standards while including the stowable and deployable functionality of the aircraft seat 100 illustrated in FIGS. 1A and 1B without the increased cost, weight, and/or installation time.

FIGS. 2A-4D generally illustrate the aircraft seat 100 including a coil hinge 200, in accordance with one or more embodiments of the disclosure. It is noted herein that any embodiments illustrated in FIGS. 1A and 1B may be considered as being able to be directed to any embodiment illustrated in FIGS. 2A-4D. Therefore, the above description should not be interpreted as a limitation on the present disclosure but merely an illustration.

Figure 2A:
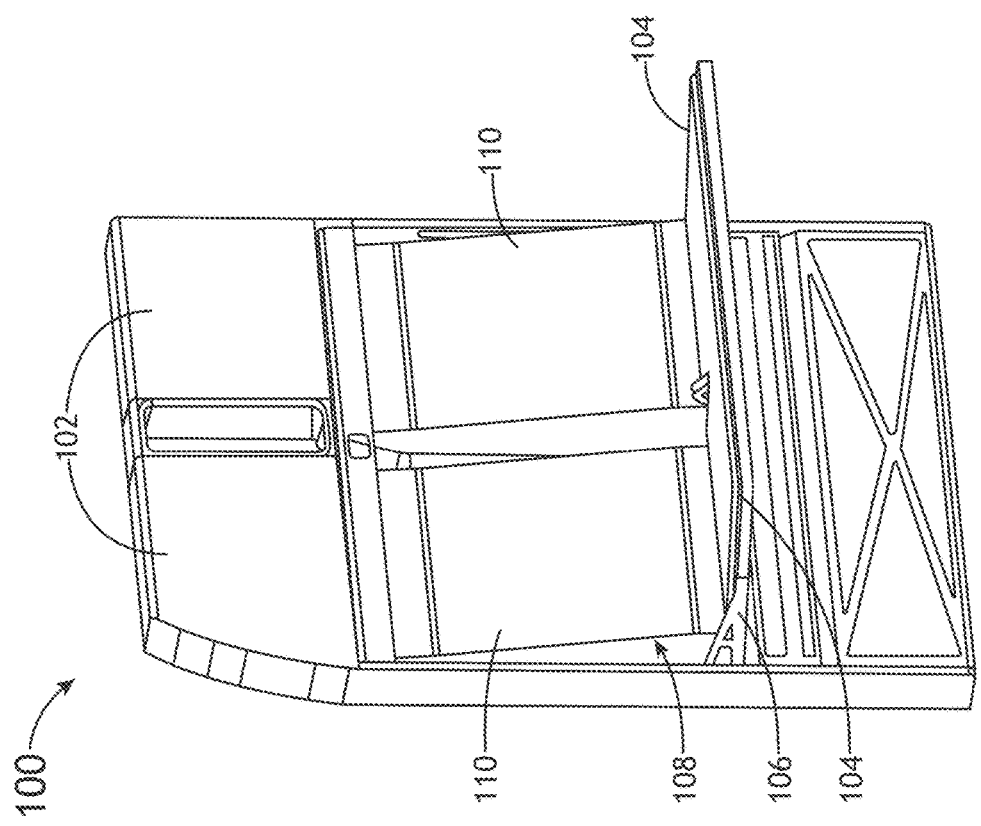
FIG. 2A illustrates a perspective view of an aircraft seat including a coil hinge, in accordance with one or more embodiments of the disclosure.

It is noted herein the aircraft seat 100 may include one or more seating locations. For example, as illustrated in FIGS. 1A and 4A-4D, the aircraft seat 100 may include a single seating location. By way of another example, as illustrated in FIG. 2A, the aircraft seat 100 may include multiple seating locations. For instance, where there are multiple seating locations, each seating location may be formed from an independent seat pan 104, actuation assembly 106, and/or backrest 110. It is noted herein that where there are multiple seating locations of the aircraft seat 100, the multiple seating locations may be actuated as a single unit or independently (e.g., via a shared actuation assembly 106 or via independent actuation assemblies 106). In addition, it is noted herein that any embodiment directed to the aircraft seat 100 including the single seating location may be directed to the aircraft seat 100 including the multiple seating locations, and vice versa.

Figure 2C:
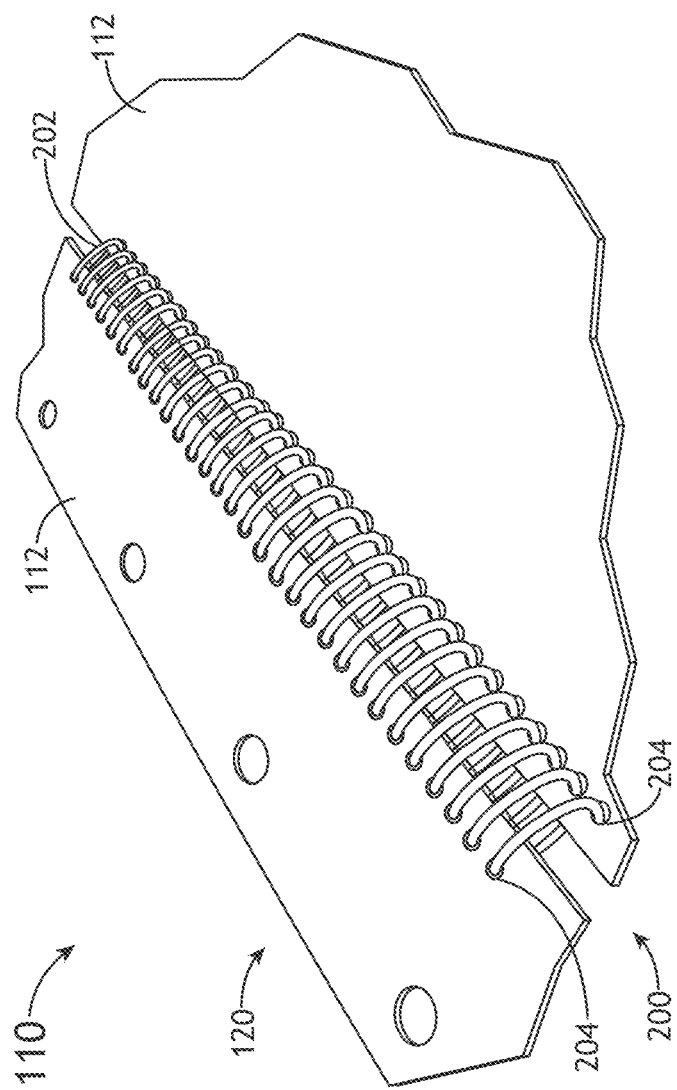
FIG. 2C illustrates a partial perspective view of a backrest of an aircraft seat including a coil hinge, in accordance with one or more embodiments of the disclosure.

Referring now to FIGS. 2A-2C, the coil hinge 200 is illustrated, in accordance with one or more embodiments of the disclosure. The coil hinge 200 may include a coil spring 202 configured to wind through one or more holes 204. The one or more holes 204 may be cut within one or more backrest panels 112 proximate to an edge of each of the one or more backrest panels 112. For example, adjacent backrest panels 112 may be coupled together via the coil spring 202 being wound through the respective one or more holes 204.

Figure 3:
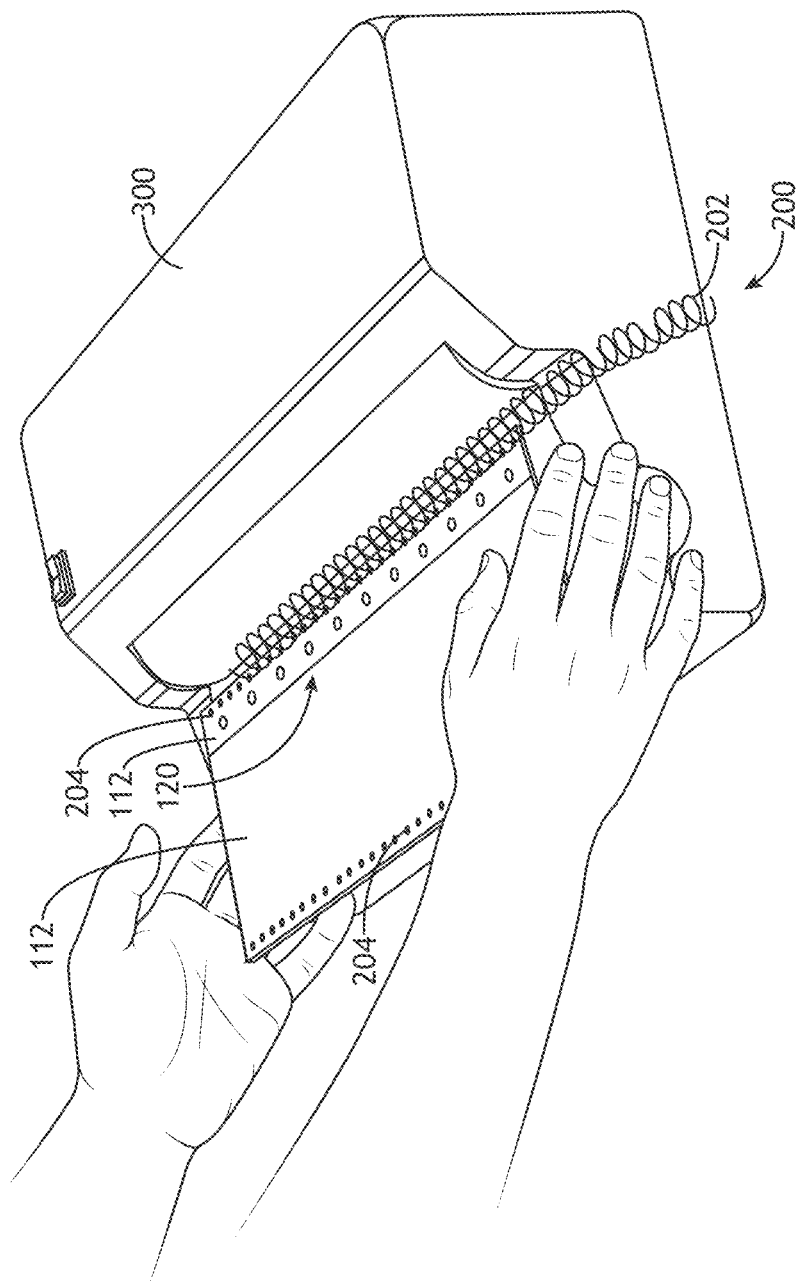
FIG. 3 illustrates a perspective view of a binding machine and a partial backrest of an aircraft seat including a coil hinge, in accordance with one or more embodiments of the disclosure.

Referring now to FIG. 3, a binding machine 300 is illustrated, in accordance with one or more embodiments of the disclosure. The backrest panels 112 may be dimensioned (e.g., length, width, thickness, weight, or the like) such that the coil spring 202 may be wound through the one or more holes 204 in adjacent backrest panels 112 via the binding machine 300. It is noted herein, however, that the backrest panels 112 may be dimensioned (e.g., length, width, thickness, weight, or the like) such that the coil spring 202 may be hand-wound through the one or more holes 204 in adjacent backrest panels 112.

Although embodiments illustrated in FIGS. 2C and 3 are directed to the backrest panel 112 including the coupling location 120 and the adjacent backrest panel 112, it is noted herein the winding of the coil hinge 200 may be considered the same or similar for any pair of backrest panels 112 within the backrest 110 of the aircraft seat 100. Therefore, the above description should not be interpreted as a limitation on the present disclosure but merely an illustration.

Referring now to FIGS. 4A-4D, perspective views of the aircraft seat 100 in various states of actuation from the stowed position to the deployed position are illustrated, in accordance with one or more embodiments of the disclosure.

Transitioning between states 400, 410, 420 as illustrated in FIGS. 4A, 4B, and 4C, respectively, the seat pan 104 may be configured to actuate between a stowed position and a deployed position. For example, the seat pan 104 may be configured to rotate about an axis between the stowed position and the deployed position. Where the backrest 110 is coupled to the seat pan 104, the actuation of the seat pan 104 may cause an actuation of the backrest 110. For example, the rotation of the seat pan 104 about the axis may cause the adjacent backrest panels 112 of the backrest 110 to rotate about respective axes between the stowed position and the deployed position via respective coil hinges 200. It is noted herein the rotation of the seat pan 104 about the axis may be in a first direction and the adjacent backrest panels of the backrest panels 112 about the respective axes via the respective coil hinges 200 may be the same first direction or at least a second direction. In general, the direction of rotation may be dependent on the direction of collapse of each backrest panel 112. For example, the one or more backrest panels 112 may be configured to collapse into the cavity 108 in such a way that the seat pan 104 may be configured to rotate about the axis in a first direction and the adjacent backrest panels of the backrest panels 112 may be configured to rotate about the respective axes via the respective coil hinges 200 in a second direction.

Figure 4D:
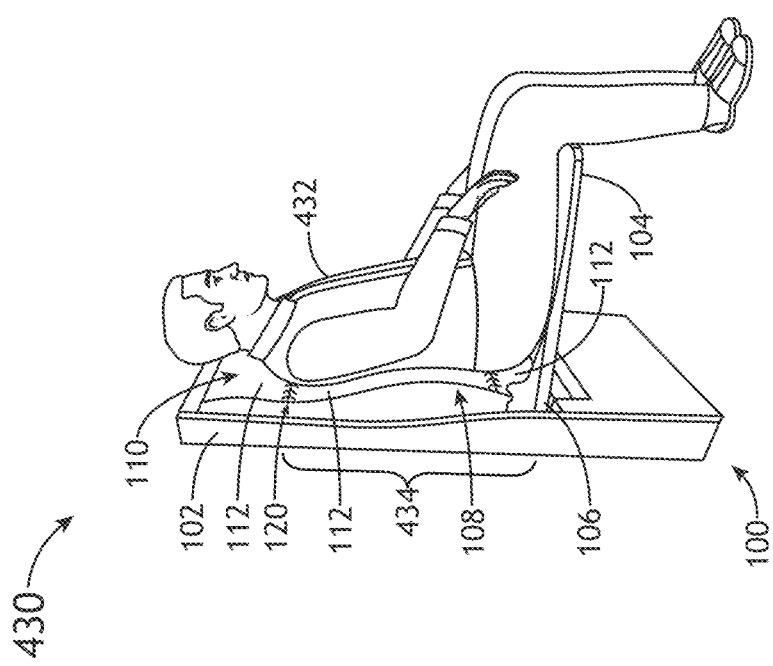
FIG. 4D illustrates a perspective view of a passenger occupying an aircraft seat including a coil hinge, in accordance with one or more embodiments of the disclosure.

In a state 430 as illustrated in FIG. 4D, the aircraft seat 100 may support a passenger 432. The one or more backrest panels 112 may be of a thickness that allows the backrest 110 to flex and conform to a portion 434 of a back of the passenger 432, for added comfort to the passenger 432 (e.g., back support, or the like), along with any cushions that may be coupled to the backrest 110. In general, the one or more backrest panels 112 may be any thickness that allows the backrest 110 to flex and conform to the portion 434 of the back of the passenger 432, to the extent the structural integrity and/or load-bearing/weight-bearing capabilities of the aircraft seat 100 are not affected (e.g., as dictated by aviation guidelines and/or standards).

It is noted herein the aircraft seat 100 may be actuated manually (e.g., via a mechanical force provided directly or indirectly to the aircraft seat 100) or electronically. Where the aircraft seat 100 is actuated electronically, the aircraft cabin 100 may include a control panel for actuating the aircraft seat 100, the control panel being coupled to an aircraft controller.

Although embodiments of the disclosure illustrate the backrest panels 112 of the backrest 100 as illustrated in FIGS. 2A-4D as being uncut (e.g., with no cut-outs 118), it is noted herein that at least some of the one or more backrest panels 112 may include the one or more cut-outs 118. Therefore, the above description should not be interpreted as a limitation on the present disclosure but merely an illustration.

It is noted herein the coil hinge 200 version of the aircraft seat 100 illustrated in FIGS. 2A-4D is capable of meeting aviation guidelines and/or standards while maintaining a stowable and deployable functionality similar to that of the hinge version of the aircraft seat 100 illustrated in FIGS. 1A and 16. In addition, it is noted herein the coil hinge 200 version of the aircraft seat 100 illustrated in FIGS. 2A-4D is less-costly, weighs less, and requires less installation time that the hinge version of the aircraft seat 100 illustrated in FIGS. 1A and 16.

Although embodiments of the disclosure are directed to a flight attendant seat version of the aircraft seat 100, it is noted herein the embodiments of the disclosure may be directed to any aircraft seat 100 within an aircraft cabin, to the extent the structural integrity and/or load-bearing/weight-bearing capabilities of the aircraft seat 100 are not affected (e.g., as dictated by aviation guidelines and/or standards). Therefore, the above description should not be interpreted as a limitation on the present disclosure but merely an illustration.

Although embodiments of the disclosure are directed to an avionics environment such as an aircraft cabin, it is noted herein the coil hinge 200 and other components of the aircraft seat 100 are not limited to the avionics environment and/or the aircraft components within the avionics environment. For example, the coil hinge 200 and other components of the aircraft seat 100 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the coil hinge 200 and other components of the aircraft seat 100 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, comprising:
   a backrest, the backrest including a plurality of backrest panels, a set of backrest panels of the plurality of backrest panels being coupled via a coil hinge, the coil hinge comprising:
      a first plurality of holes formed in a first backrest panel of the set of backrest panels;
      a second plurality of holes formed in a second backrest panel of the set of backrest panels; and
      a coil spring wound through the first plurality of holes and the second plurality of holes; and
   a seat pan coupled to the backrest, the seat pan and the backrest configured to actuate between a stowed position and a deployed position, the first backrest panel and the second backrest panel being configured to rotate about an axis through the coil hinge when the seat pan and the backrest actuate between the stowed position and the deployed position.

2. The aircraft seat of claim 1, further comprising:
   a housing, a cavity being defined within the housing, at least a portion of the seat pan and at least a portion of the backrest being configured to stow within the cavity when the seat pan and the backrest are in the stowed position.

3. The aircraft seat of claim 2, wherein the set of backrest panels of the plurality of backrest panels is a first set of backrest panels, the plurality of backrest panels including a second set of backrest panels, the second set of backrest panels including the second backrest panel and a third backrest panel.

4. The aircraft seat of claim 3, wherein second set of backrest panels of the plurality of backrest panels are coupled via a second coil hinge, the second coil hinge comprising:
   a third plurality of holes formed in the second backrest panel of the second set of backrest panels;
   a fourth plurality of holes formed in the third backrest panel of the second set of backrest panels; and
   a second coil spring wound through the third plurality of holes and the fourth plurality of holes,
   the second backrest panel and the third backrest panel being configured to rotate about an axis through the second coil hinge when the seat pan and the backrest actuate between the stowed position and the deployed position.

5. The aircraft seat of claim 4, wherein the third backrest panel of the plurality of backrest panels is coupled to the housing.

6. The aircraft seat of claim 4, wherein the plurality of backrest panels includes a third set of backrest panels, the third set of backrest panels including the third backrest panel and a fourth backrest panel.

7. The aircraft seat of claim 6, wherein the third set of backrest panels of the plurality of backrest panels are coupled via a third coil hinge, the third coil hinge comprising:
   a fifth plurality of holes formed in the third backrest panel of the third set of backrest panels;
   a sixth plurality of holes formed in the fourth backrest panel of the third set of backrest panels; and
   a third coil spring wound through the fifth plurality of holes and the sixth plurality of holes,
   the third backrest panel and the fourth backrest panel being configured to rotate about an axis through the third coil hinge when the seat pan and the backrest actuate between the stowed position and the deployed position.

8. The aircraft seat of claim 7, wherein the fourth backrest panel of the plurality of backrest panels is coupled to the housing.

9. The aircraft seat of claim 8, wherein at least one of the first coil spring is configured to be wound through the first plurality of holes and the second plurality of holes, the second coil spring is configured to be wound through the third plurality of holes and the fourth plurality of holes, or the third coil spring is configured to be wound through the fifth plurality of holes and the sixth plurality of holes via a binding machine.

10. The aircraft seat of claim 2, further comprising:
    one or more actuation assemblies, the seat pan being coupled to the housing via the one or more actuation assemblies.

11. The aircraft seat of claim 1, wherein the first backrest panel of the plurality of backrest panels is coupled to the seat pan.

12. The aircraft seat of claim 1, wherein at least one backrest panel of the plurality of backrest panels includes one or more cut-outs.

13. The aircraft seat of claim 1, wherein the backrest is a first backrest, the aircraft seat further includes a second backrest, the first back rest and the second backrest each being coupled to the seat pan.

14. The aircraft seat of claim 1, wherein the plurality of backrest panels are configured to flex and conform to a back of a passenger occupying the seat pan and the backrest when the seat pan and the backrest are in the deployed position.

15. A coil hinge for an aircraft seat, comprising:
    a first plurality of holes formed in a first backrest panel of a set of backrest panels;
    a second plurality of holes formed in a second backrest panel of the set of backrest panels; and
    a coil spring wound through the first plurality of holes and the second plurality of holes,
    the coil hinge configured to provide an axis of rotation for the first backrest panel and the second backrest panel when a backrest of the aircraft seat and a seat pan of the aircraft seat coupled to the backrest actuate between a stowed position and a deployed position, the backrest being formed from a plurality of backrest panels, the plurality of backrest panels including the set of backrest panels.

\* \* \* \* \*